United States Patent
Szeto et al.

(10) Patent No.: US 9,332,066 B2
(45) Date of Patent: *May 3, 2016

(54) CONNECTION RATE LIMITING FOR SERVER LOAD BALANCING AND TRANSPARENT CACHE SWITCHING

(71) Applicant: Foundry Networks, LLC, San Jose, CA (US)

(72) Inventors: Ronald W. Szeto, Pleasanton, CA (US); David Chun-Ying Cheung, San Jose, CA (US); Rajkumar Jalan, Saratoga, CA (US)

(73) Assignee: Foundry Networks, LLC, San Jose, CA (US)

( * ) Notice: Subject to any disclaimer, the term of this patent is extended or adjusted under 35 U.S.C. 154(b) by 199 days.

This patent is subject to a terminal disclaimer.

(21) Appl. No.: 14/033,398

(22) Filed: Sep. 20, 2013

(65) Prior Publication Data

US 2014/0025772 A1 Jan. 23, 2014

Related U.S. Application Data

(63) Continuation of application No. 10/139,076, filed on May 3, 2002, now Pat. No. 8,554,929.

(51) Int. Cl.
*G06F 15/173* (2006.01)
*H04L 29/08* (2006.01)
*H04L 29/06* (2006.01)

(52) U.S. Cl.
CPC ........ *H04L 67/1002* (2013.01); *H04L 63/0218* (2013.01); *H04L 67/1031* (2013.01); *H04L 67/1036* (2013.01); *H04L 67/2842* (2013.01); *H04L 63/1458* (2013.01)

(58) Field of Classification Search
CPC ............ H04L 67/1002; H04L 67/1031; H04L 67/1036
USPC ................ 709/202–203, 223–229, 235–237; 718/104–105
See application file for complete search history.

(56) References Cited

U.S. PATENT DOCUMENTS

| 4,926,480 | A | 5/1990 | Chaum |
|---|---|---|---|
| 5,761,507 | A | 6/1998 | Govett |
| 5,774,660 | A | 6/1998 | Brendel et al. |
| 5,956,489 | A | 9/1999 | San Andres et al. |

(Continued)

OTHER PUBLICATIONS

U.S. Appl. No. 10/139,073, filed May 3, 2002.

(Continued)

*Primary Examiner* — Bharat N Barot
(74) *Attorney, Agent, or Firm* — Fountainhead Law Group P.C.

(57) ABSTRACT

Each service in a computer network may have a connection rate limit. The number of new connections per time period may be limited by using a series of rules. In a specific embodiment of the present invention, a counter is increased each time a server is selected to handle a connection request. For each service, connections coming in are tracked. Therefore, the source of connection-request packets need not be examined. Only the destination service is important. This saves significant time in the examination of the incoming requests. Each service may have its own set of rules to best handle the new traffic for its particular situation. For server load balancing, a reset may be sent to the source address of the new connection request. For transparent cache switching, the connection request may be forwarded to the Internet.

20 Claims, 13 Drawing Sheets

(56) References Cited

U.S. PATENT DOCUMENTS

| | | | |
|---|---|---|---|
| 6,044,260 | A | 3/2000 | Eaton et al. |
| 6,075,772 | A | 6/2000 | Brown et al. |
| 6,088,452 | A | 7/2000 | Johnson et al. |
| 6,185,601 | B1 * | 2/2001 | Wolff ............................ 709/203 |
| 6,195,680 | B1 | 2/2001 | Goldszmidt et al. |
| 6,314,465 | B1 * | 11/2001 | Paul et al. ..................... 709/226 |
| 6,336,133 | B1 | 1/2002 | Morris et al. |
| 6,381,642 | B1 | 4/2002 | O'Donnell et al. |
| 6,389,448 | B1 | 5/2002 | Primak et al. |
| 6,438,652 | B1 | 8/2002 | Jordan et al. |
| 6,457,061 | B1 | 9/2002 | Bal et al. |
| 6,526,448 | B1 | 2/2003 | Blewett |
| 6,546,423 | B1 | 4/2003 | Dutta et al. |
| 6,587,881 | B1 | 7/2003 | Agarwal et al. |
| 6,597,661 | B1 | 7/2003 | Bonn |
| 6,701,415 | B1 | 3/2004 | Hendren, III |
| 6,763,372 | B1 | 7/2004 | Dani et al. |
| 6,816,905 | B1 * | 11/2004 | Sheets ................. H04L 67/1014 709/226 |
| 6,851,062 | B2 | 2/2005 | Hartmann et al. |
| 6,856,991 | B1 | 2/2005 | Srivastava |
| 6,857,025 | B1 | 2/2005 | Maruyama et al. |
| 6,883,033 | B2 * | 4/2005 | Maruyama .......... H04L 67/1002 709/229 |
| 7,007,092 | B2 | 2/2006 | Peiffer |
| 7,107,609 | B2 | 9/2006 | Cheng et al. |
| 7,131,140 | B1 | 10/2006 | O'Rourke et al. |
| 7,584,262 | B1 | 9/2009 | Wang et al. |
| 7,707,295 | B1 | 4/2010 | Szeto et al. |
| 8,554,929 | B1 * | 10/2013 | Szeto et al. .................... 709/229 |
| 8,572,228 | B2 | 10/2013 | Szeto et al. |
| 8,819,252 | B1 | 8/2014 | Szeto et al. |
| 8,949,471 | B2 * | 2/2015 | Hall ..................... H04L 67/1002 709/250 |
| 2001/0039585 | A1 | 11/2001 | Primak et al. |
| 2001/0042200 | A1 | 11/2001 | Lamberton et al. |
| 2001/0047415 | A1 | 11/2001 | Skene et al. |
| 2002/0040400 | A1 | 4/2002 | Masters |
| 2002/0099831 | A1 | 7/2002 | Tsunogai |
| 2003/0041146 | A1 | 2/2003 | Davis et al. |
| 2004/0024861 | A1 * | 2/2004 | Coughlin ............ H04L 67/1002 709/224 |
| 2004/0158637 | A1 * | 8/2004 | Lee .......................... G06F 9/505 709/226 |
| 2004/0162901 | A1 | 8/2004 | Mangipudi et al. |
| 2010/0235507 | A1 | 9/2010 | Szeto et al. |
| 2011/0082947 | A1 | 4/2011 | Szeto et al. |

OTHER PUBLICATIONS

U.S. Office Action in U.S. Appl. No. 10/139,073, dated Sep. 20, 2005.
U.S. Office Action in U.S. Appl. No. 10/139,073, dated Mar. 31, 2006.
U.S. Office Action in U.S. Appl. No. 10/139,073, dated Jan. 29, 2007.
U.S. Office Action in U.S. Appl. No. 10/139,073, dated Aug. 16, 2007.
U.S. Office Action in U.S. Appl. No. 10/139,073, dated Jan. 10, 2008.
U.S. Office Action in U.S. Appl. No. 10/139,073, dated Sep. 12, 2008.
U.S. Office Action in U.S. Appl. No. 10/139,073, dated Apr. 27, 2009.
U.S. Office Action in U.S. Appl. No. 10/139,073, dated Jan. 5, 2010.
U.S. Appl. No. 10/139,076, filed May 3, 2002.
U.S. Office Action in U.S. Appl. No. 10/139,076, dated Jul. 13, 2005.
U.S. Office Action in U.S. Appl. No. 10/139,076, dated Mar. 23, 2006.
U.S. Office Action in U.S. Appl. No. 10/139,076, dated Jul. 25, 2006.
U.S. Office Action in U.S. Appl. No. 10/139,076, dated Mar. 12, 2007.
U.S. Office Action in U.S. Appl. No. 10/139,076, dated Sep. 11, 2007.
U.S. Office Action in U.S. Appl. No. 10/139,076, dated Feb. 21, 2008.
U.S. Office Action in U.S. Appl. No. 10/139,076, dated Mar. 31, 2009.
U.S. Office Action in U.S. Appl. No. 10/139,076, dated Sep. 9, 2009.
U.S. Appl. No. 10/139,095, filed May 3, 2002.
U.S. Office Action in U.S. Appl. No. 10/139,095, dated Nov. 23, 2005.
U.S. Office Action in U.S. Appl. No. 10/139,095, dated May 18, 2006.
U.S. Office Action in U.S. Appl. No. 10/139,095, dated Jan. 18, 2007.
U.S. Office Action in U.S. Appl. No. 10/139,095, dated Aug. 3, 2007.
U.S. Office Action in U.S. Appl. No. 10/139,095, dated Mar. 13, 2009.
U.S. Office Action in U.S. Appl. No. 10/139,095, dated Nov. 10, 2009.
U.S. Notice of Allowance in U.S. Appl. No. 10/139,073, dated Mar. 8, 2010.
U.S. Office Action in U.S. Appl. No. 10/139,095, dated Mar. 24, 2010.
U.S. Notice of Allowance in U.S. Appl. No. 10/139,076, dated Apr. 28, 2010.
U.S. Appl. No. 12/785,423, filed May 21, 2010.
U.S. Office Action in U.S. Appl. No. 10/139,095, dated Aug. 31, 2010.
U.S. Office Action in U.S. Appl. No. 10/139,076, dated Jan. 4, 2011.
U.S. Office Action in U.S. Appl. No. 12/785,423, dated May 11, 2011.
U.S. Appeal in U.S. Appl. No. 10/139,095, dated Apr. 18, 2011.
U.S. Office Action in U.S. Appl. No. 12/723,615, dated Jul. 1, 2011.
U.S. Office Action in U.S. Appl. No. 10/139,076 OA, dated Aug. 31, 2011.
U.S. Office Action in U.S. Appl. No. 12/723,615, dated Nov. 30, 2011.
U.S. Office Action in U.S. Appl. No. 12/785,423, dated Jan. 6, 2012.
U.S. Notice of Allowance in U.S. Appl. No. 10/139,076, dated Feb. 26, 2013.
U.S. Office Action in U.S. Appl. No. 12/723,615, dated Mar. 15, 2013.
U.S. Notice of Allowance in U.S. Appl. No. 12/785,423, dated Jun. 25, 2013.
U.S. Notice of Allowance in U.S. Appl. 10/139,076, mailed on Jun. 13, 2013.
"ProCurve Switch 5300xl Series," ProCurve Networking, HP Innovation, Datasheet, Jan. 2009, 10 pages.
Notice of Allowance in U.S. Appl. No. 10/139,095, mailed May 1, 2014, 8 pages.
Final Office Action in U.S. Appl. No. 12/723,615, mailed Jul. 29, 2014; 13 pages.

* cited by examiner

CONNECTION RATE LIMITING FOR SERVER LOAD BALANCING AND TRANSPARENT CACHE SWITCHING

CROSS-REFERENCE TO RELATED APPLICATION

This application is a continuation of U.S. patent application Ser. No. 10/139,076, entitled "Connection Rate Limiting For Server Load Balancing And Transparent Cache Switching," filed on May 3, 2002, now U.S. Pat. No. 8,554,929, granted Oct. 8, 2013, which is related to application Ser. No. 10/139,073, filed May 3, 2002, now U.S. Pat. No. 7,707,295, granted Apr. 27, 2010, by Ronald W. Szeto, David Chun Ying Cheung, and Rajkumar Jalan, entitled "CONNECTION RATE LIMITING".

This application is also related to application Ser. No. 12/785,423, entitled "Connection Rate Limiting For Server Load Balancing And Transparent Cache Switching," filed May 21, 2010, now U.S. Pat. No. 8,572,228, granted Oct. 29, 2013, which is also a continuation of U.S. patent application Ser. No. 10/139,076, entitled "Connection Rate Limiting For Server Load Balancing And Transparent Cache Switching," filed on May 3, 2002.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to the field of web switches. More particularly, the present invention relates to connection rate limiting to ensure proper functioning of components on a web switch.

BACKGROUND OF THE INVENTION

Web switches provide traffic management to computer networks. The traffic management extends to packets received both from an outside network, such as the Internet, and from an internal network. A web switch may provide a series of software components to better handle the traffic. These components may include server load balancing (SLB), transparent cache switching (TCS), and firewall load balancing (FWLB). Server load balancing allows IP-based services to be transparently balanced across multiple servers. This distributed design prevents servers from getting overloaded. Transparent cache switching allows for distributed cache servers, and likewise prevents the cache servers from getting overloaded. Firewall load balancing increases the network's overall firewall performance by distributing the Internet traffic load across multiple firewalls.

Even though these software components are designed to manage traffic, the components themselves may become overwhelmed when traffic is heavy. For example, a server running TCS may become so overloaded with connections that it fails to properly handle packets sent through the connections. Traditional techniques for handling such a situation involve limiting the packet rate. This involves monitoring the number of packets received in short intervals, and dropping or redirecting packets if the number exceeds a threshold value. Unfortunately, for traffic management components, the number of packets received is not a direct predictor of when the components will become overloaded. These traffic management components are more likely to become overloaded when new connections are being established too quickly, as opposed to when new packets are coming in over those connections.

What is needed is a solution to better handle increased traffic to traffic management components.

BRIEF DESCRIPTION OF THE INVENTION

Each service in a computer network may have a connection rate limit. The number of new connections per time period may be limited by using a series of rules. In a specific embodiment of the present invention, a counter is increased each time a server is selected to handle a connection request. For each service, connections coming in are tracked. Therefore, the source of connection-request packets need not be examined. Only the destination service is important. This saves significant time in the examination of the incoming requests. Each service may have its own set of rules to best handle the new traffic for its particular situation. For server load balancing, a reset may be sent to the source address of the new connection request. For transparent cache switching, the connection request may be forwarded to the Internet.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
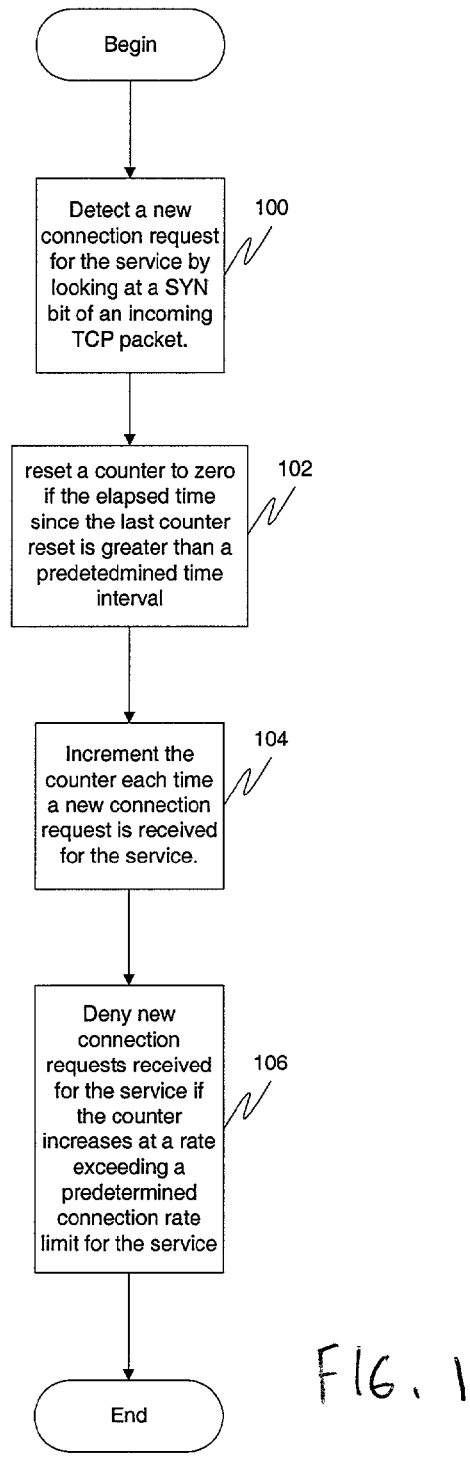
FIG. 1 is a flow diagram illustrating a method for managing a traffic management service in a computer network in accordance with a specific embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

A traffic management component may be distributed over many different servers. Therefore, for purposes of this application a specific component type (such as TCS) may be referred to as a service. In accordance with a specific embodiment of the present invention, each service has a connection rate limit. The number of new connections per time period may be limited by using a series of rules. In a specific embodiment of the present invention, a counter is increased each time a server is selected to handle a connection request. For each service, connections coming in are tracked. Therefore, the source of connection-request packets need not be examined. Only the destination service is important. This saves significant time in the examination of the incoming requests. Each service may have its own set of rules to best handle the new traffic for its particular situation.

In accordance with a specific embodiment of the present invention, a new transmission control protocol (TCP) connection request may be detected by looking at the SYN bit of the incoming packet. If it is set to on, then the packet is a new connection request. In accordance with another specific embodiment of the present invention, a new user datagram protocol (UDP) connection request may be detected by looking for any packet that doesn't have a session.

In accordance with a specific embodiment of the present invention, connection rate limiting is applied to a server load balancing service. Upon receipt of a connection request that would exceed the maximum number of permitted connections per second, a reset is sent to the client (requesting party). Thus, instead of a user's request simply appearing to "hang" indefinitely, feedback is provided to the user to try again.

In accordance with a specific embodiment of the present invention, connection rate limiting is applied to transparent cache switching. Upon receipt of a connection request that would exceed the maximum number of permitted connections per second, the request is sent to the Internet. Thus, instead of not getting the service at all, the user still has a strong change of getting the request served. This process is transparent to the user.

In accordance with a specific embodiment of the present invention, connection rate limiting is applied to firewall load balancing. Upon receipt of a connection request that would exceed the maximum number of permitted connections per second, the request is hashed to send it to a specific firewall. A hashing scheme may be applied to determine to which firewall to send the connection request. Different criteria may be applied in the hash table. For example, the hash table may be defined to direct the request to the firewall with the least connections. Alternatively, a round robin approach may be applied. In another embodiment, a weighted approach may be applied. The "scheme" may alternatively be a lack of a scheme, i.e., packets are simply dropped if the number of permitted connections per second is exceeded.

In accordance with another embodiment of the present invention, the connection rate limiting may be applied on a per server basis in addition to or instead of a per service basis. For example, the number of connections sent to a particular firewall may be limited, but other firewalls in the system may have no limiting or a different limiting scheme applied.

FIG. 1 is a flow diagram illustrating a method for managing a traffic management service in a computer network in accordance with a specific embodiment of the present invention. At 100, a new connection request for the service is detected by looking at a SYN bit of an incoming transmission control protocol (TCP) packet. Alternatively, a new connection request for the service may be detected by looking for any user datagram protocol (UDP) packets without a session. At 102, a counter is reset to zero if the elapsed time since the last counter reset is greater than a predetermined time interval. At 104, a counter is incremented each time a new connection request is received for the service. At 106, new connection requests received for the service are denied if the counter increases at a rate exceeding a predetermined connection rate limit for the service. This denial may comprise sending a reset to a source address contained in a new connection request. Alternatively, it may comprise forwarding the new connection request to the Internet. It may also forward the new connection request in accordance with criteria in a hash table. The connection rate limit may be a number of connections per predetermined time interval.

Figure 2:
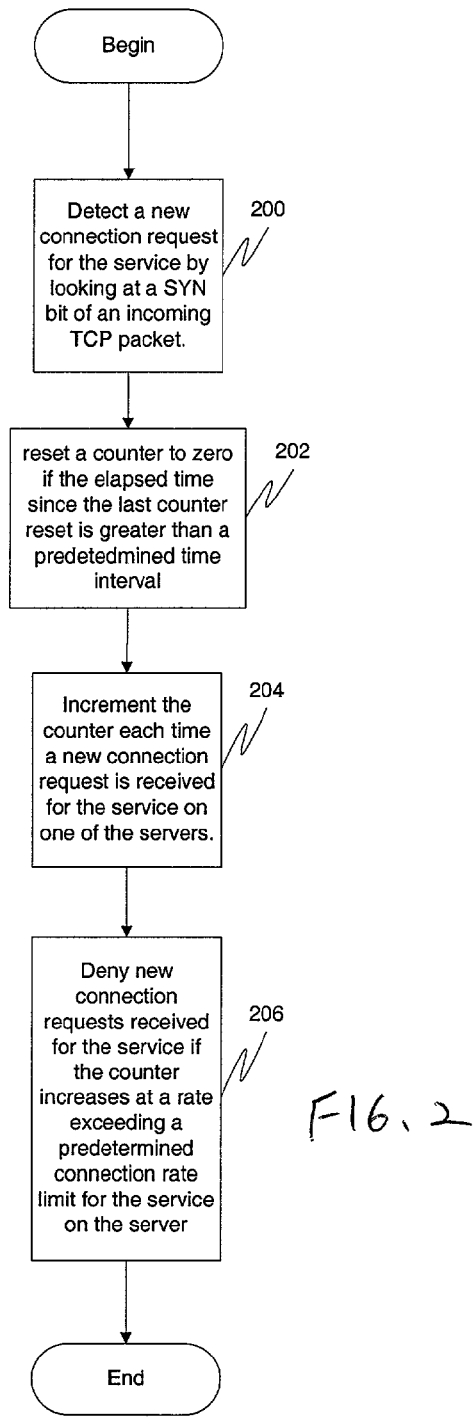
FIG. 2 is a flow diagram illustrating a method for managing a traffic management service distributed over multiple servers in a computer network in accordance with a specific embodiment of the present invention.

FIG. 2 is a flow diagram illustrating a method for managing a traffic management service distributed over multiple servers in a computer network in accordance with a specific embodiment of the present invention. At 200, a new connection request for the service is detected by looking at a SYN bit of an incoming transmission control protocol (TCP) packet. Alternatively, a new connection request for the service may be detected by looking for any user datagram protocol (UDP) packets without a session. At 202, a counter is reset to zero if the elapsed time since the last counter reset is greater than a predetermined time interval. At 204, a counter is incremented each time a new connection request is received for the service on one of the servers. At 206, new connection requests received for the service on the one server are denied if the counter increases at a rate exceeding a predetermined connection rate limit for the service on that server. This denying may comprise sending a reset to a source address contained in a new connection request. Alternatively, it may comprise forwarding the new connection request to the Internet. It may also forward the new connection request in accordance with criteria in a hash table. The connection rate limit may be a number of connections per predetermined time interval.

Figure 3:
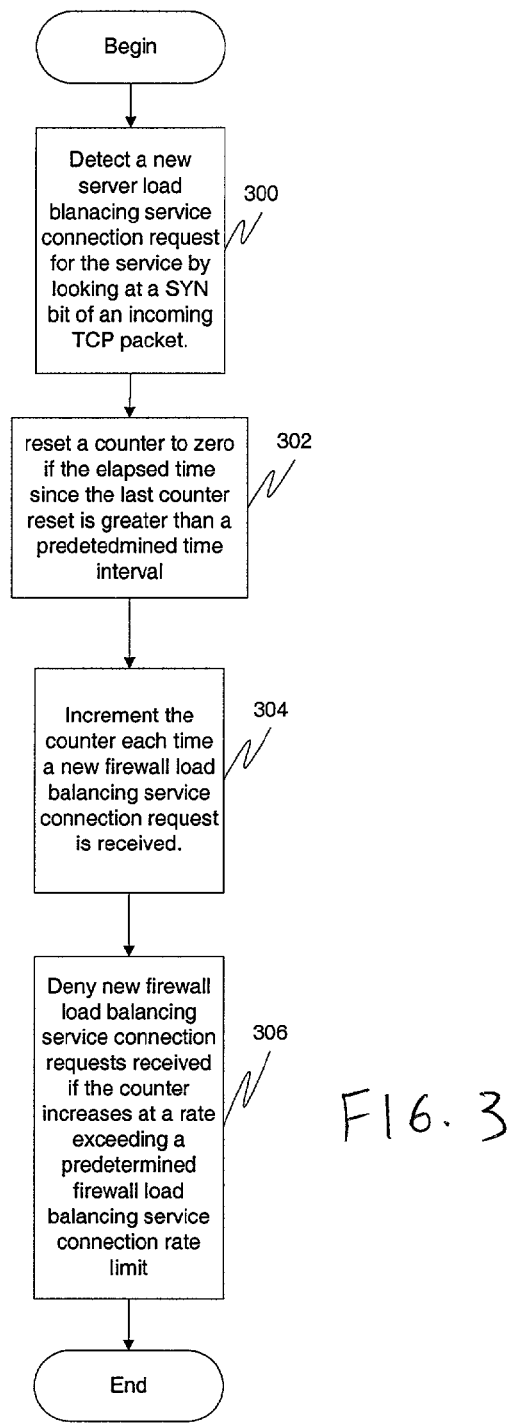
FIG. 3 is a flow diagram illustrating a method for managing a firewall load balancing service in a computer network in accordance with a specific embodiment of the present invention.

FIG. 3 is a flow diagram illustrating a method for managing a firewall load balancing service in a computer network in accordance with a specific embodiment of the present invention. At 300, a new firewall load balancing service connection request is detected by looking at a SYN bit of an incoming transmission control protocol (TCP) packet. Alternatively, a new firewall load balancing service connection request may be detected by looking for any user datagram protocol (UDP) packets without a session. At 302, a counter is reset to zero if the elapsed time since the last counter reset is greater than a predetermined time interval. At 304, a counter is incremented each time a new firewall load balancing service connection request is received. At 306, new firewall load balancing service connection requests are dropped if the counter increases at a rate exceeding a predetermined firewall load balancing service connection rate limit. The connection rate limit may be a number of connections per predetermined time interval.

Figure 4:
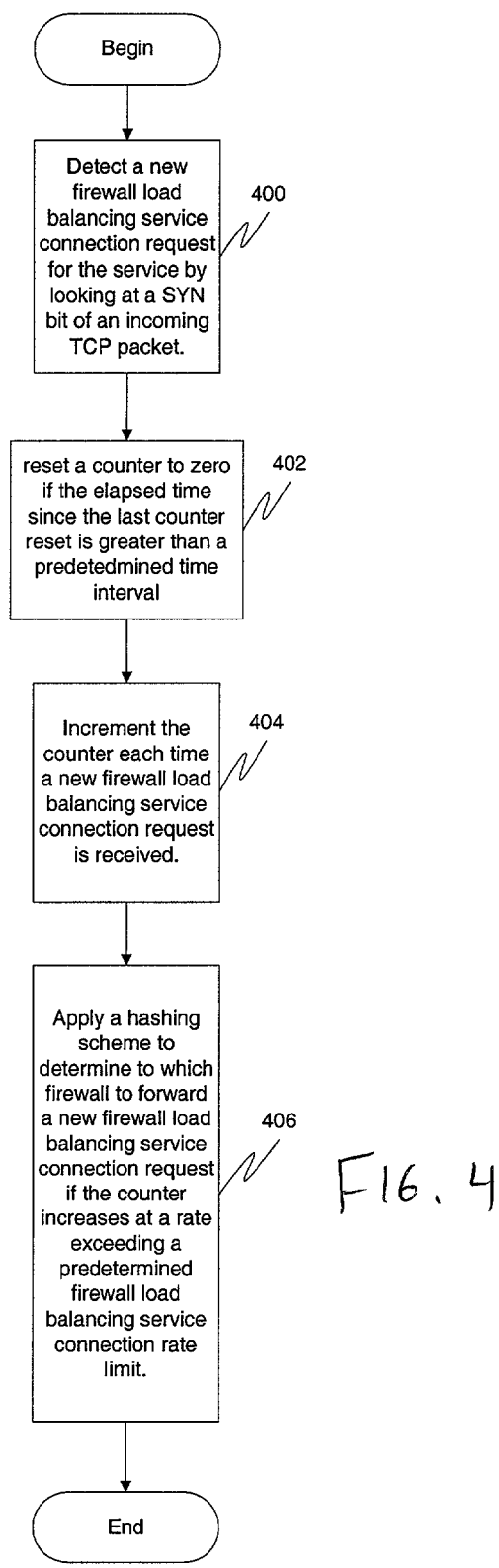
FIG. 4 is a flow diagram illustrating a method for managing a firewall load balancing service distributed over multiple firewalls in a computer network in accordance with a specific embodiment of the present invention.

FIG. 4 is a flow diagram illustrating a method for managing a firewall load balancing service distributed over multiple firewalls in a computer network in accordance with a specific embodiment of the present invention. At 400, a new firewall load balancing service connection request for the service is detected by looking at a SYN bit of an incoming transmission control protocol (TCP) packet. Alternatively, a new firewall load balancing service connection request for the service may be detected by looking for any user datagram protocol (UDP) packets without a session. At 402, a counter is reset to zero if the elapsed time since the last counter reset is greater than a predetermined time interval. At 404, a counter is incremented each time a new firewall load balancing service connection request is received. At 406, a hashing scheme is applied to determine to which firewall to forward a new firewall load balancing service connection request if the counter increases at a rate exceeding a predetermined firewall load balancing service connection rate limit. The hashing scheme may be one of several different possibilities. It may comprise directing a new firewall load balancing service connection request to the firewall with the least connections. It may comprise directing a new firewall load balancing service connection request to a firewall according to a round robin approach. It may comprise directing a new firewall load balancing service connection request to a firewall according to a weighted approach. The connection rate limit may be a number of connections per predetermined time interval.

Figure 5:
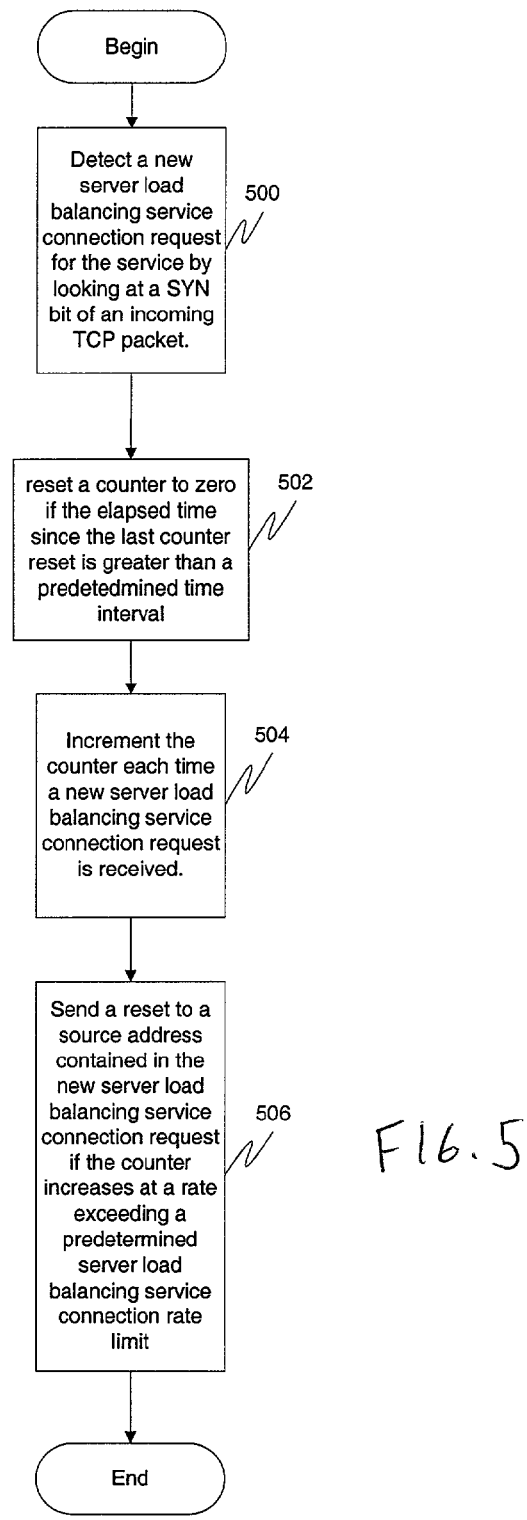
FIG. 5 is a flow diagram illustrating a method for managing a server load balancing service in a computer network in accordance with a specific embodiment of the present invention.

FIG. 5 is a flow diagram illustrating a method for managing a server load balancing service in a computer network in accordance with a specific embodiment of the present invention. At 500, a new server load balancing service connection request is detected by looking at a SYN bit of an incoming transmission control protocol (TCP) packet. Alternatively, a new server load balancing connection request may be detected by looking for any user datagram protocol (UDP) packets without a session. At 502, a counter is reset to zero if the elapsed time since the last counter reset is greater than a predetermined time interval. At 504, a counter is incremented each time a new server load balancing service connection request is received. At 506, a reset is sent to a source address contained in the new server load balancing service connection request if the counter increases at a rate exceeding a predetermined server load balancing service connection rate limit. The connection rate limit may be a number of connections per predetermined time interval.

Figure 6:
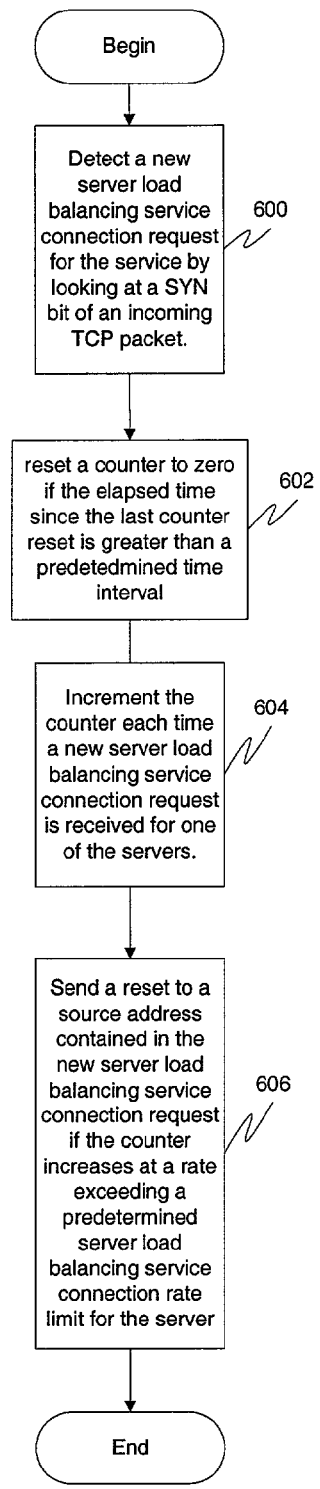
FIG. 6 is a flow diagram illustrating a method for managing a server load balancing service distributed over multiple servers in a computer network in accordance with a specific embodiment of the present invention.

FIG. 6 is a flow diagram illustrating a method for managing a server load balancing service distributed over multiple servers in a computer network in accordance with a specific embodiment of the present invention. At 600, a new server load balancing service connection request for the server is detected by looking at a SYN bit of an incoming transmission control protocol (TCP) packet. Alternatively, a new server load balancing connection request for the server may be detected by looking for any user datagram protocol (UDP) packets without a session. At 602, a counter is reset to zero if the elapsed time since the last counter reset is greater than a predetermined time interval. At 604, a counter is incremented each time a new server load balancing service connection request for the server is received. At 606, a reset is sent to a source address contained in the new server load balancing service connection request if the counter increases at a rate exceeding a predetermined server load balancing service connection rate limit for the server. The connection rate limit may be a number of connections per predetermined time interval.

Figure 7:
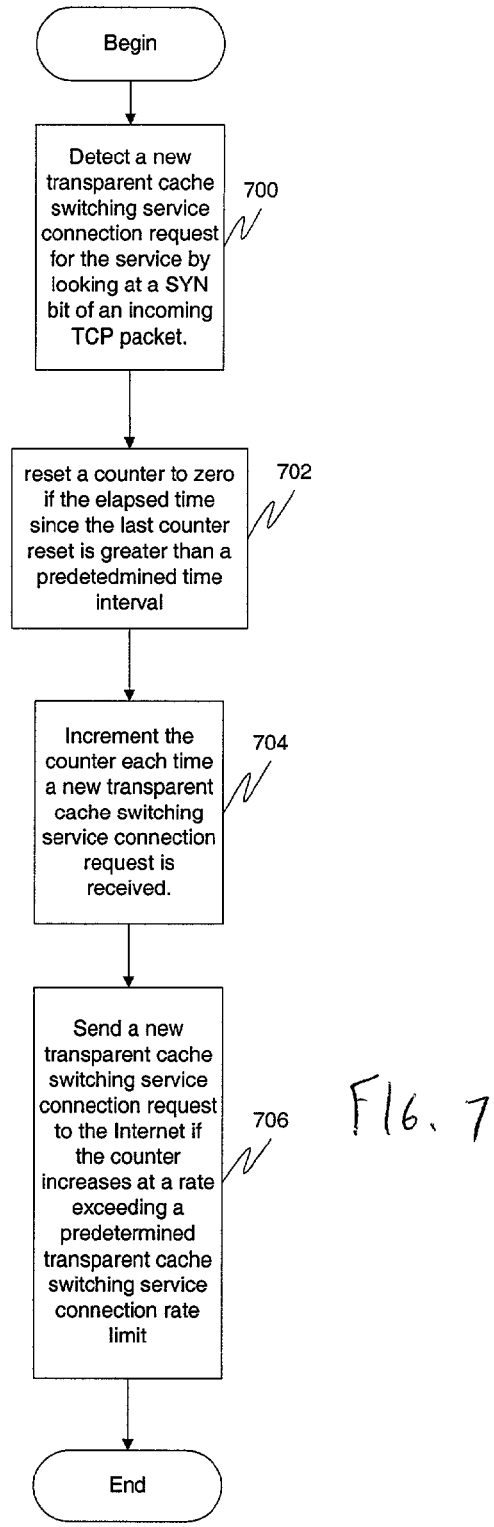
FIG. 7 is a flow diagram illustrating a method for managing a transparent cache switching service in a computer network in accordance with a specific embodiment of the present invention.

FIG. 7 is a flow diagram illustrating a method for managing a transparent cache switching service in a computer network in accordance with a specific embodiment of the present invention. At 700, a new transparent cache switching service connection request is detected by looking at a SYN bit of an incoming transmission control protocol (TCP) packet. Alternatively, a new transparent cache switching service connection request may be detected by looking for any user datagram protocol (UDP) packets without a session. At 702, a counter is reset to zero if the elapsed time since the last counter reset is greater than a predetermined time interval. At 704, a counter is incremented each time a new transparent cache switching service connection request is received. At 706, the new transparent cache switching service connection request is sent to the Internet if the counter increases at a rate exceeding a predetermined transparent cache switching service connection rate limit. The connection rate limit may be a number of connections per predetermined time interval.

Figure 8:
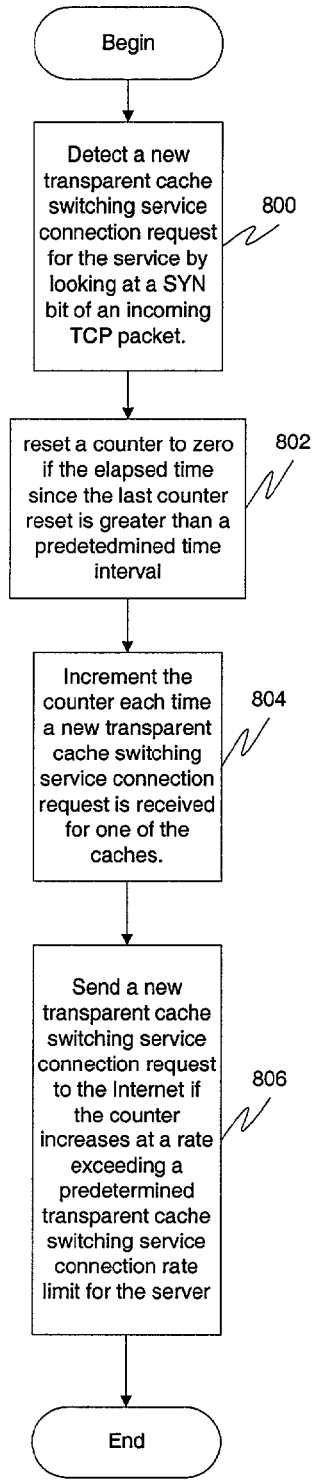
FIG. 8 is a flow diagram illustrating a method for managing a transparent cache switching service distributed over multiple caches in a computer network in accordance with a specific embodiment of the present invention.

FIG. 8 is a flow diagram illustrating a method for managing a transparent cache switching service distributed over multiple caches in a computer network in accordance with a specific embodiment of the present invention. At 800, a new transparent cache switching service connection request for one of the caches is detected by looking at a SYN bit of an incoming transmission control protocol (TCP) packet. Alternatively, a new transparent cache switching service connection request for one of the caches may be detected by looking for any user datagram protocol (UDP) packets without a session. At 802, a counter is reset to zero if the elapsed time since the last counter reset is greater than a predetermined time interval. At 804, a counter is incremented each time a new transparent cache switching service connection request for the cache is received. At 806, the new transparent cache switching service connection request is sent to the Internet if the counter increases at a rate exceeding a predetermined transparent cache switching service connection rate limit for the cache. The connection rate limit may be a number of connections per predetermined time interval.

Figure 9:
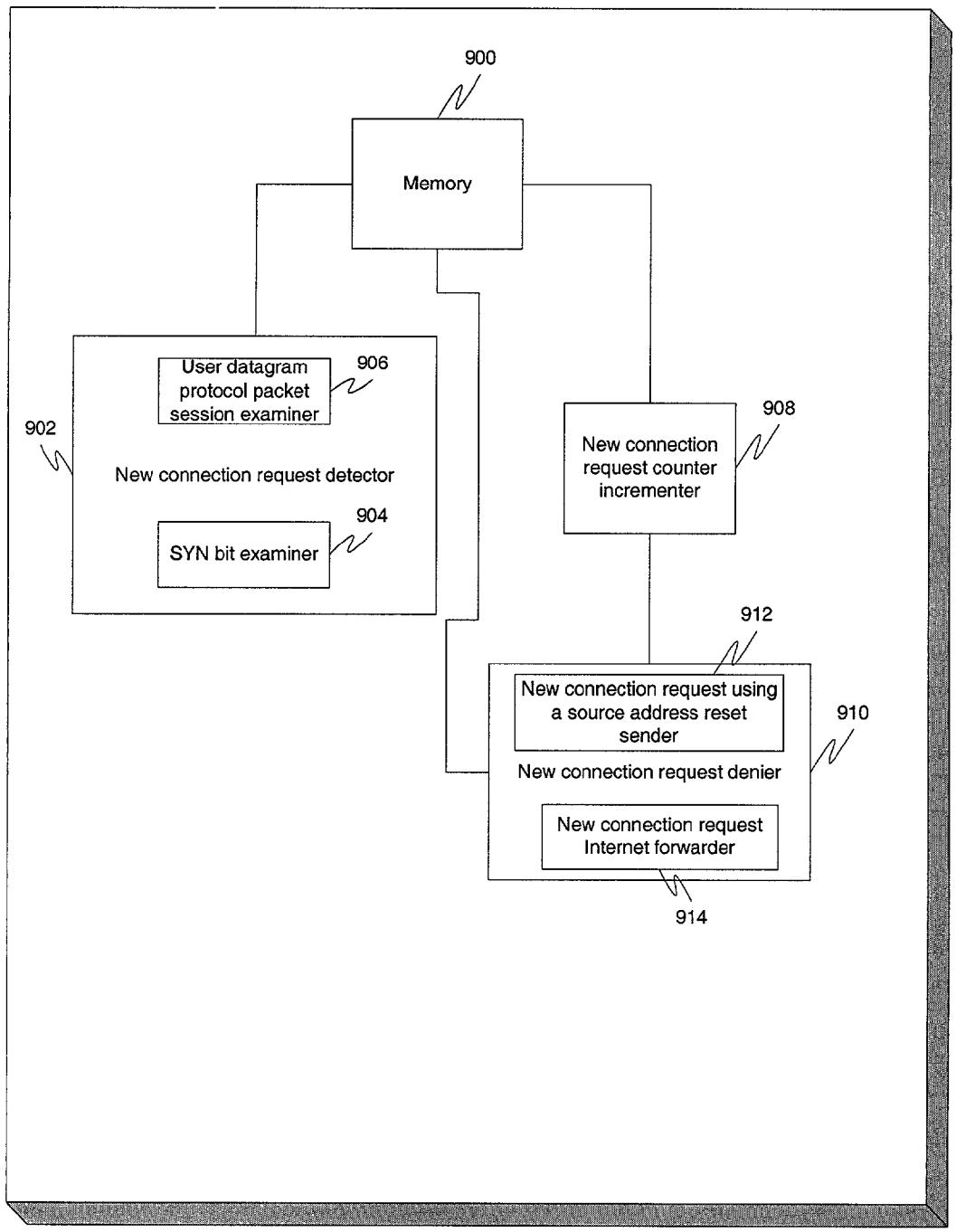
FIG. 9 is a block diagram illustrating an apparatus for managing a traffic management service in a computer network in accordance with a specific embodiment of the present invention.

FIG. 9 is a block diagram illustrating an apparatus for managing a traffic management service in a computer network in accordance with a specific embodiment of the present invention. A memory 900 may be used to store a counter. A new connection request detector 902 may detect a new connection request for the service. A SYN bit examiner 904 may be used for this purpose to look at a SYN bit of an incoming transmission control protocol (TCP) packet. Alternatively, a user datagram protocol packet session examiner 906 may detect a new connection request for the service by looking for any user datagram protocol (UDP) packets without a session. A counter is reset to zero if the elapsed time since the last counter reset is greater than a predetermined time interval. A new connection request counter incrementer 908 coupled to the memory 900 and to the new connection request detector 902 increments the counter each time a new connection request is received for the service. If the service is distributed over multiple servers and the request is for one of the servers, the new connection request counter incrementer 908 may increment a counter each time a new connection request is received for the service on the one server. A new connection request denier 910 coupled to the new connection request counter incrementer 908 and to the memory 900 denies new connection requests received for the service if the counter increases at a rate exceeding a predetermined connection rate limit for the service. If the service is distributed over multiple servers and the request is for one of the servers, the new connection request denier 910 may deny new connection requests received for the service on the server if the counter increases at a rate exceeding a predetermined connection rate limit for the service on the server. This denying may comprise sending a reset to a source address contained in a new connection request using a source address reset sender 912. Alternatively, it may comprise forwarding the new connection request to the Internet using a new connection request Internet forwarder 914. It may also forward the new connection request as per a hash table using a new connection request hash table forwarder 916. The connection rate limit may be a number of connections per predetermined time interval.

Figure 10:
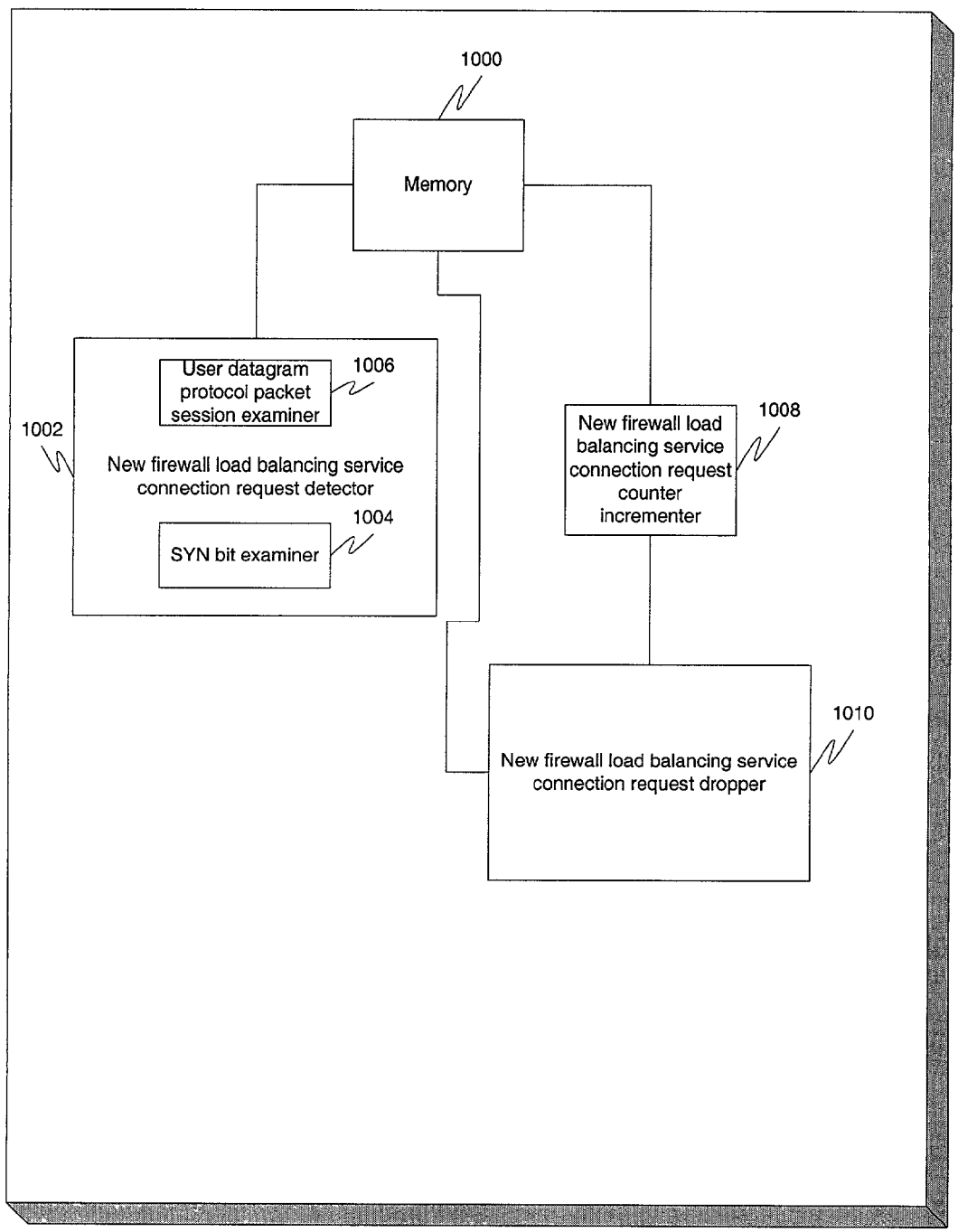
FIG. 10 is a block diagram illustrating an apparatus for managing a firewall load balancing service in a computer network in accordance with a specific embodiment of the present invention.

FIG. 10 is a block diagram illustrating an apparatus for managing a firewall load balancing service in a computer network in accordance with a specific embodiment of the present invention. A memory 1000 may be used to store a counter. A new firewall load balancing service connection request detector 1002 may detect a new firewall load balancing service connection request. A SYN bit examiner 1004 may be used for this purpose to look at a SYN bit of an incoming transmission control protocol (TCP) packet. Alternatively, a user datagram protocol packet session examiner 1006 may detect a new firewall load balancing connection request by looking for any user datagram protocol (UDP) packets without a session. A counter is reset to zero if the elapsed time since the last counter reset is greater than a predetermined time interval. A new firewall load balancing service connection request counter incrementer 1008 coupled to the memory 1000 and to the new firewall load balancing service connection request detector 1002 increments the counter each time a new firewall load balancing service connection request is received. A new firewall load balancing service connection request dropper 1010 coupled to the new firewall load balancing service connection request counter incrementer 1008 and to the memory 1000 drops new firewall load balancing service connection requests if the counter increases at a rate exceeding a predetermined firewall load balancing service connection rate limit. The connection rate limit may be a number of connections per predetermined time interval.

Figure 11:
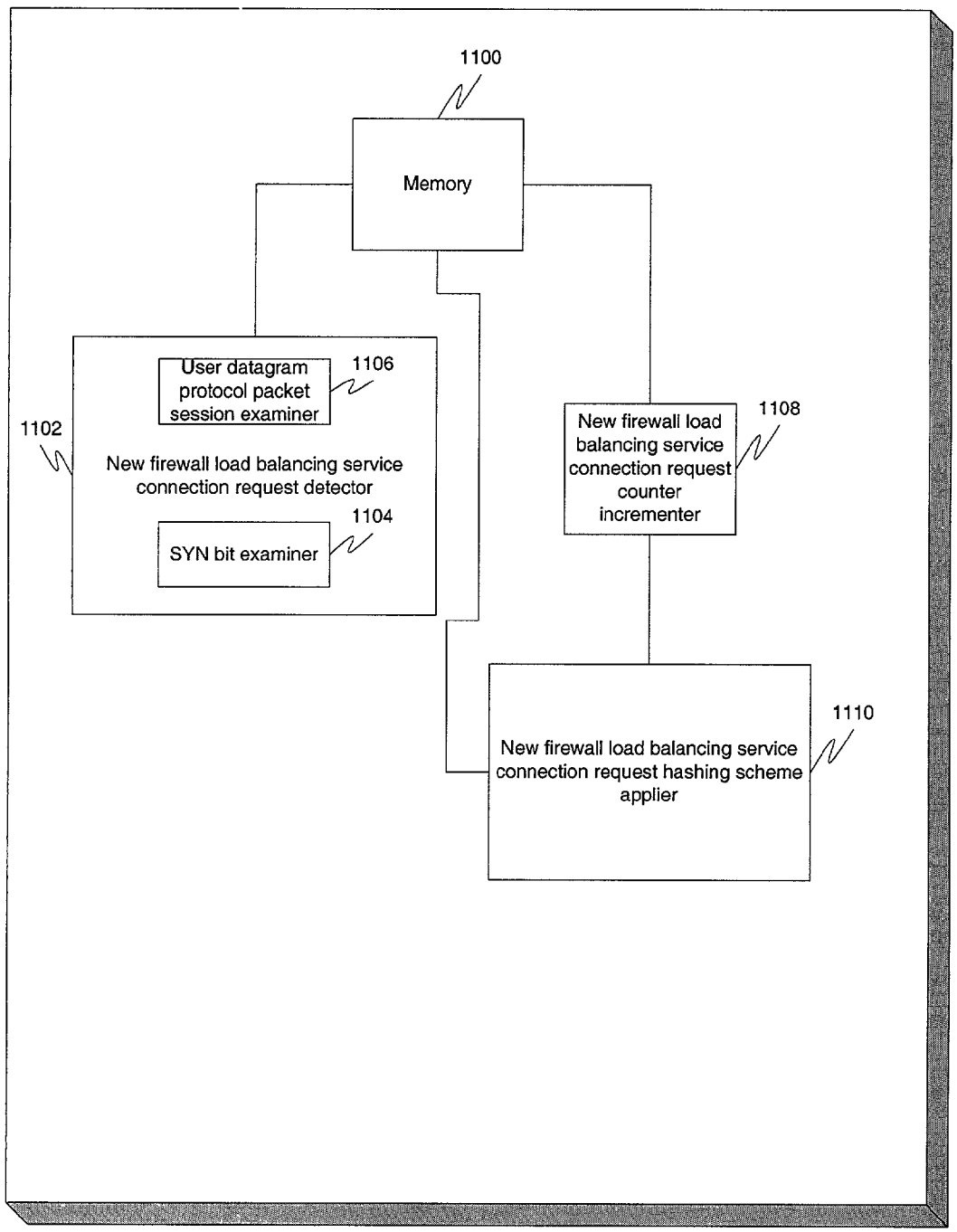
FIG. 11 is a block diagram illustrating an apparatus for managing a firewall load balancing service distributed over multiple firewalls in a computer network in accordance with a specific embodiment of the present invention.

FIG. 11 is a block diagram illustrating an apparatus for managing a firewall load balancing service distributed over multiple firewalls in a computer network in accordance with a specific embodiment of the present invention. A memory 1100 may be used to store a counter. A new firewall load balancing service connection request detector 1102 may detect a new firewall load balancing service connection request. A SYN bit examiner 1104 may be used for this purpose to look at a SYN bit of an incoming transmission control protocol (TCP) packet. Alternatively, a user datagram protocol packet session examiner 1106 may detect a new firewall load balancing service connection request by looking for any user datagram protocol (UDP) packets without a session. A counter is reset to zero if the elapsed time since the last counter reset is greater than a predetermined time interval. A new firewall load balancing service connection request counter incrementer 1108 coupled to the memory 1100 and to the new firewall load balancing service connection request detector 1102 increments the counter each time a new firewall load balancing service connection request is received. A new firewall load balancing service connection request hashing scheme applier 1110 coupled to the new firewall load balancing service connection request counter incrementer 1108 and to the memory 1100 applies a hashing scheme to determine to which firewall to forward a new firewall load balancing service connection request if the counter increases at a rate exceeding a predetermined firewall load balancing service connection rate limit. The hashing scheme may be one of several different possibilities. It may comprise directing a new firewall load balancing service connection request to the firewall with the least connections. It may comprise directing a new firewall load balancing service connection request to a firewall according to a round robin approach. It may comprise directing a new firewall load balancing service connection request to a firewall according to a weighted approach. The connection rate limit may be a number of connections per predetermined time interval.

Figure 12:
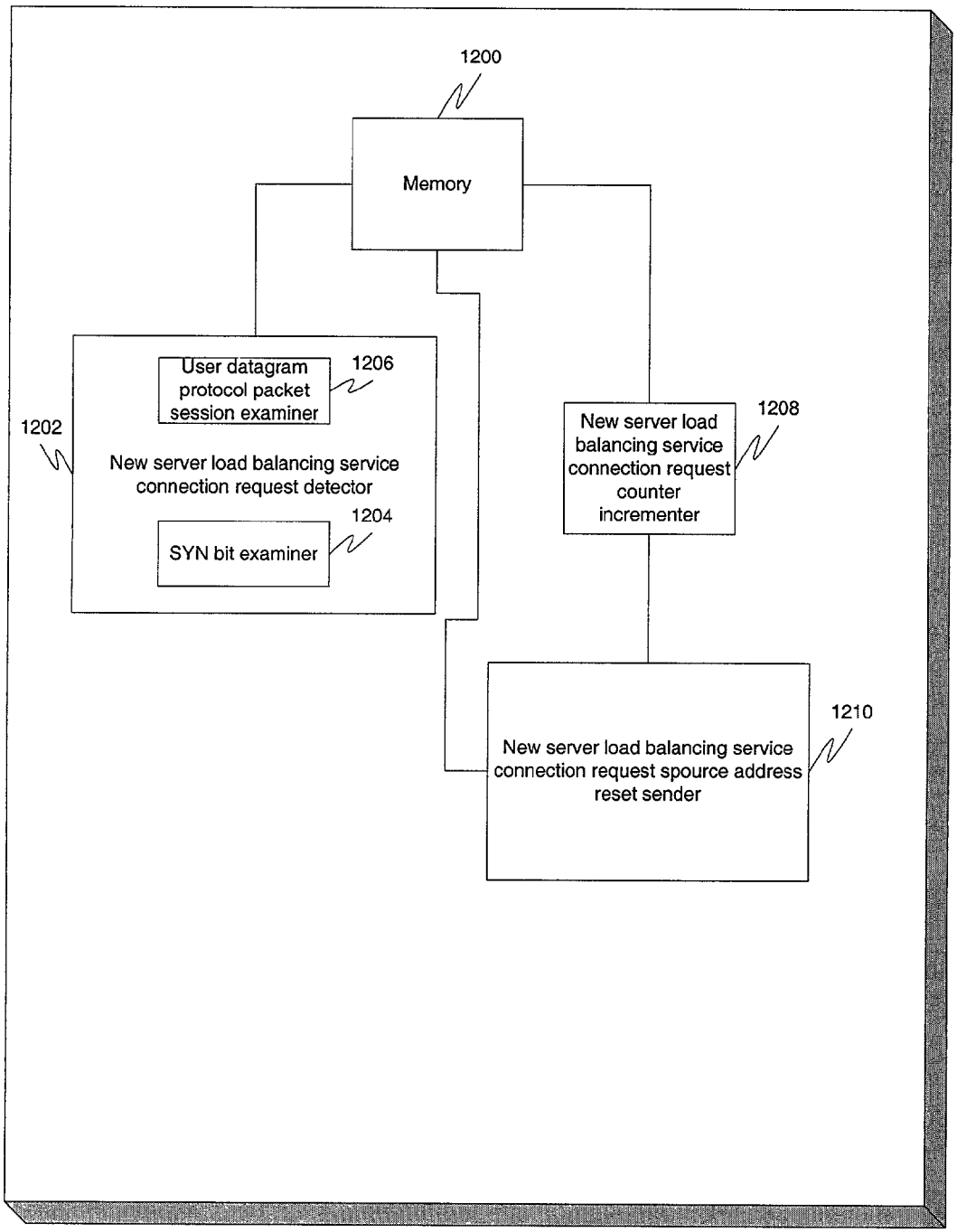
FIG. 12 is a block diagram illustrating an apparatus for managing a server load balancing service in a computer network in accordance with a specific embodiment of the present invention.

FIG. 12 is a block diagram illustrating an apparatus for managing a server load balancing service in a computer network in accordance with a specific embodiment of the present invention. A memory 1200 may be used to store a counter. A new server load balancing service connection request detector 1202 may detect a new server load balancing service connection request. A SYN bit examiner 1204 may be used for this purpose to look at a SYN bit of an incoming transmission control protocol (TCP) packet. Alternatively, a user datagram protocol packet session examiner 1206 may detect a new server load balancing service connection request for the service by looking for any user datagram protocol (UDP) packets without a session. A counter is reset to zero if the elapsed time since the last counter reset is greater than a predetermined time interval. A new server load balancing service connection request counter incrementer 1208 coupled to the memory 1200 and to the new server load balancing service connection request detector 1202 increments a counter each time a new server load balancing connection request is received. If the service is distributed over multiple servers and the request is for one of the servers, the new server load balancing service connection request counter incrementer 1208 may increment the counter each time a new server load balancing service connection request is received for the server. A new server load balancing service connection request source address reset sender 1210 coupled to the new server load balancing service connection request counter incrementer 1208 and to the memory 1200 sends a reset to the source address of the new server load balancing service connection request if the counter increases at a rate exceeding a predetermined server load balancing service connection rate limit. If the service is distributed over multiple servers and the request is for one of the servers, the new server load balancing service connection request source address reset sender 1210 may send a reset to the source address of the new server load balancing service connection request if the counter increases at a rate exceeding a predetermined connection rate limit for the service on the server. The connection rate limit may be a number of connections per predetermined time interval.

Figure 13:
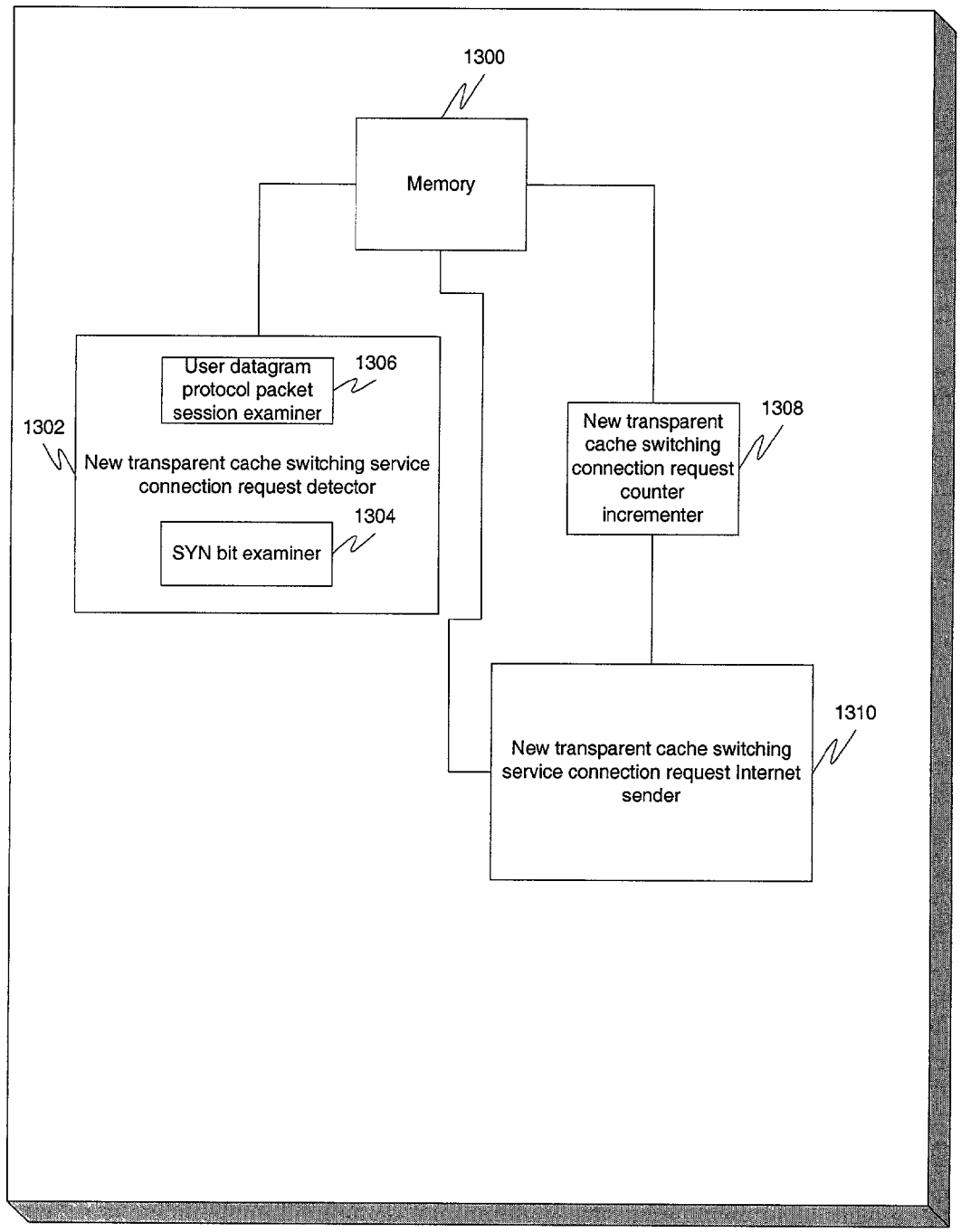
FIG. 13 is a block diagram illustrating an apparatus for managing a transparent cache switching service in a computer network in accordance with a specific embodiment of the present invention.

FIG. 13 is a block diagram illustrating an apparatus for managing a transparent cache switching service in a computer network in accordance with a specific embodiment of the present invention. A memory 1300 may be used to store a counter. A new transparent cache switching service connection request detector 1302 may detect a new transparent cache switching service connection request. A SYN bit examiner 1304 may be used for this purpose to look at a SYN bit of an incoming transmission control protocol (TCP) packet. Alternatively, a user datagram protocol packet session examiner 1306 may detect a new transparent cache switching service connection request for the service by looking for any user datagram protocol (UDP) packets without a session. A counter is reset to zero if the elapsed time since the last counter reset is greater than a predetermined time interval. A new transparent cache switching service connection request counter incrementer 1308 coupled to the memory 1300 and to the new transparent cache switching service connection request detector 1302 increments the counter each time a new transparent cache switching connection request is received. If the service is distributed over multiple caches and the request is for one of the caches, the new transparent cache switching service connection request counter incrementer 1308 may increment a counter each time a new transparent cache switching service connection request is received for the cache. A new transparent cache switching service connection request Internet sender 1310 coupled to the new transparent cache switching service connection request counter incrementer 1308 and to the memory 1300 sends the new transparent cache switching service connection request to the Internet if the counter increases at a rate exceeding a predetermined transparent cache switching service connection rate limit. If the service is distributed over multiple caches and the request is for one of the caches, the new transparent cache switching service connection request Internet sender 1310 may send the new transparent cache switching service connection request to the Internet if the counter increases at a rate exceeding a predetermined transparent cache switching service connection rate limit for the cache. The connection rate limit may be a number of connections per predetermined time interval.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for managing a server load balancing service in a computer network, the method comprising:
   incrementing, by a server, a counter each time a new server load balancing service connection request is received; and
   if said counter increases at a rate exceeding a predetermined server load balancing service connection rate limit, sending, by the server, a reset to a source address contained in said new server load balancing service connection request, the source address identifying a source of said new server load balancing service connection request.

2. The method of claim 1, further including resetting said counter to zero if the elapsed time since the last counter reset is greater than a predetermined time interval.

3. The method of claim 2, wherein said predetermined connection rate limit is a number of transactions per predetermined time interval.

4. The method of claim 1, further comprising detecting a new server load balancing service connection request by looking at a SYN bit of an incoming transmission control protocol (TCP) packet.

5. The method of claim 1, further comprising detecting a new server load balancing service connection request by looking for any user datagram protocol (UDP) packets without a session.

6. A method for managing a server load balancing service distributed over multiple servers in a computer network, the method comprising:
   incrementing, by a switch, a counter each time a new server load balancing service connection request for one of the servers is received; and
   if said counter increases at a rate exceeding a predetermined server load balancing service connection rate limit, sending, by the switch, a reset to a source address contained in said new server load balancing service connection request, the source address identifying a source of said new server load balancing service connection request.

7. The method of claim 6, further including resetting said counter to zero if the elapsed time since the last counter reset is greater than a predetermined time interval.

8. The method of claim 7, wherein said predetermined connection rate limit is a number of transactions per predetermined time interval.

9. The method of claim 6, further comprising detecting a new server load balancing service connection request for said server by looking at a SYN bit of an incoming transmission control protocol (TCP) packet.

10. The method of claim 6, further comprising detecting a new server load balancing service connection request for said server by looking for any user datagram protocol (UDP) packets without a session.

11. An apparatus for managing a server load balancing service in a computer network, the apparatus comprising:
   a memory; and
   a processor coupled to said memory that, upon executing program code stored in said memory, causes the apparatus to:
      increment a counter each time a new server load balancing service connection request is received; and
      if said counter increases at a rate exceeding a predetermined server load balancing service connection rate limit, send a reset to a source address contained in said new server load balancing service connection request, the source address identifying a source of said new server load balancing service connection request.

12. The apparatus of claim 11, wherein the processor further causes the apparatus to reset said counter to zero if the elapsed time since the last counter reset is greater than a predetermined time interval.

13. The apparatus of claim 11, wherein the processor further causes the apparatus to detect a new server load balancing service connection request by looking at a SYN bit of an incoming transmission control protocol (TCP) packet.

14. The apparatus of claim 11, wherein the processor further causes the apparatus to detect a new server load balancing service connection request by looking for any user datagram protocol (UDP) packets without a session.

15. An apparatus for managing a transparent cache switching service in a computer network, the apparatus comprising:
   a memory; and
   a processor coupled to said memory that, upon executing program code stored in said memory, causes the apparatus to:
      increment a counter each time a new transparent cache switching service connection request is received; and
      if said counter increases at a rate exceeding a predetermined server load balancing service connection rate limit, send a reset to a source address contained in said new transparent cache switching service connection request, the source address identifying a source of said new transparent cache switching service connection request.

16. The apparatus of claim 15, wherein the processor further causes the apparatus to reset said counter to zero if the elapsed time since the last counter reset is greater than a predetermined time interval.

17. The apparatus of claim 16, wherein the processor further causes the apparatus to detect a new transparent cache switching service connection request by looking at a SYN bit of an incoming transmission control protocol (TCP) packet.

18. The apparatus of claim 16, wherein the processor further causes the apparatus to detect a new transparent cache switching service connection request by looking for any user datagram protocol (UDP) packets without a session.

19. A program storage device readable by a machine, tangibly embodying a program of instructions executable by the machine to perform a method for managing a server load balancing service in a computer network, the method comprising:
   incrementing, by the machine, a counter each time a new server load balancing service connection request is received; and
   if said counter increases at a rate exceeding a predetermined server load balancing service connection rate limit, sending, by the machine, a reset to a source address contained in said new server load balancing service connection request, the source address identifying a source of said new server load balancing service connection request.

20. A program storage device readable by a machine, tangibly embodying a program of instructions executable by the machine to perform a method for managing a server load balancing service distributed over multiple servers in a computer network, the method comprising:
   incrementing, by the machine, a counter each time a new server load balancing service connection request for one of the servers is received; and
   if said counter increases at a rate exceeding a predetermined server load balancing service connection rate limit, sending, by the machine, a reset to a source address contained in said new server load balancing service connection request, the source address identifying a source of said new server load balancing service connection request.

* * * * *